(12) United States Patent
Salter

(10) Patent No.: US 9,387,802 B2
(45) Date of Patent: Jul. 12, 2016

(54) PHOTOLUMINESCENT POWER DISTRIBUTION BOX

(71) Applicant: Ford Global Technologies, LLC, Dearborn, MI (US)

(72) Inventor: Stuart C. Salter, White Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 44 days.

(21) Appl. No.: 14/589,228

(22) Filed: Jan. 5, 2015

(65) Prior Publication Data

US 2015/0138814 A1     May 21, 2015

Related U.S. Application Data

(63) Continuation-in-part of application No. 14/086,442, filed on Nov. 21, 2013.

(51) Int. Cl.
    *B60Q 1/00*     (2006.01)
    *B60Q 1/26*     (2006.01)
    *B60Q 3/06*     (2006.01)
    *B60Q 3/02*     (2006.01)

(52) U.S. Cl.
    CPC ............... *B60Q 3/06* (2013.01); *B60Q 3/0283* (2013.01); *B60Q 3/0293* (2013.01)

(58) Field of Classification Search
    CPC .......... B60Q 3/008; B60Q 3/006; F21K 9/56; H05B 37/0218; H05B 37/0227
    USPC .......................... 362/487, 496, 502, 509–510
    See application file for complete search history.

(56) References Cited

U.S. PATENT DOCUMENTS

| | | | |
|---|---|---|---|
| 3,308,257 A | 3/1967 | Thompson |
| 4,035,754 A | 7/1977 | Kleinbohl |
| 5,709,453 A | 1/1998 | Krent et al. |
| 6,729,738 B2 | 5/2004 | Fuwausa et al. |
| 6,773,129 B2 | 8/2004 | Anderson, Jr. et al. |
| 6,851,840 B2 | 2/2005 | Ramamurthy et al. |
| 6,871,986 B2 | 3/2005 | Yamanaka et al. |
| 6,990,922 B2 | 1/2006 | Ichikawa et al. |
| 7,213,923 B2 | 5/2007 | Liu et al. |
| 7,264,366 B2 | 9/2007 | Hulse |
| 7,264,367 B2 | 9/2007 | Hulse |
| 7,441,914 B2 | 10/2008 | Palmer et al. |
| 7,570,147 B2 | 8/2009 | Muller |
| 7,745,818 B2 | 6/2010 | Sofue et al. |
| 7,753,541 B2 | 7/2010 | Chen et al. |
| 7,834,548 B2 | 11/2010 | Jousse et al. |
| 7,862,220 B2 | 1/2011 | Cannon et al. |
| 7,987,030 B2 | 7/2011 | Flores et al. |

(Continued)

FOREIGN PATENT DOCUMENTS

| | | |
|---|---|---|
| CN | 201169230 Y | 12/2008 |
| CN | 101337492 A | 1/2009 |

(Continued)

*Primary Examiner* — Jason Moon Han
(74) *Attorney, Agent, or Firm* — Jason Rogers; Price Heneveld LLP

(57) ABSTRACT

An illumination apparatus for a vehicle is disclosed. The apparatus comprises at least one photoluminescent portion disposed proximate a electrical panel disposed in an engine compartment. A lighting controller is in communication with a lighting device located proximate the engine compartment. The light source configured to emit a first emission to excite the at least one photoluminescent portion.

20 Claims, 9 Drawing Sheets

(56) References Cited

U.S. PATENT DOCUMENTS

| | | |
|---|---|---|
| 8,016,465 B2 | 9/2011 | Egerer et al. |
| 8,071,988 B2 | 12/2011 | Lee et al. |
| 8,203,260 B2 | 6/2012 | Li et al. |
| 8,286,378 B2 | 10/2012 | Martin et al. |
| 8,408,766 B2 | 4/2013 | Wilson et al. |
| 8,421,811 B2 | 4/2013 | Odland et al. |
| 8,466,438 B2 | 6/2013 | Lambert et al. |
| 8,519,362 B2 | 8/2013 | Labrot et al. |
| 8,606,430 B2 | 12/2013 | Seder et al. |
| 8,624,716 B2 | 1/2014 | Englander |
| 8,631,598 B2 | 1/2014 | Li et al. |
| 8,683,722 B1 | 4/2014 | Cowan |
| 8,724,054 B2 | 5/2014 | Jones |
| 8,773,012 B2 | 7/2014 | Ryu et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0213088 A1 | 10/2004 | Fuwausa |
| 2006/0087826 A1 | 4/2006 | Anderson, Jr. |
| 2007/0032319 A1 | 2/2007 | Tufte |
| 2007/0285938 A1 | 12/2007 | Palmer et al. |
| 2009/0219730 A1 | 9/2009 | Syfert et al. |
| 2009/0251920 A1 | 10/2009 | Kino et al. |
| 2012/0001406 A1 | 1/2012 | Paxton et al. |
| 2012/0218113 A1 | 8/2012 | Stanek et al. |
| 2012/0223801 A1 | 9/2012 | Moon |
| 2012/0280528 A1 | 11/2012 | Dellock et al. |
| 2013/0335994 A1 | 12/2013 | Mulder et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 | 6/2007 |
| EP | 2778209 A1 | 9/2014 |
| JP | 2000159011 A | 6/2000 |
| JP | 2007238063 A | 9/2007 |
| KR | 20030088587 A | 11/2003 |
| WO | 2006047306 A1 | 5/2006 |
| WO | 2014068440 A1 | 5/2014 |

PHOTOLUMINESCENT POWER DISTRIBUTION BOX

CROSS-REFERENCE TO RELATED APPLICATIONS

This application is a continuation-in-part of U.S. patent application Ser. No. 14/086,442, filed Nov. 21, 2013, and entitled "VEHICLE LIGHTING SYSTEM WITH PHOTOLUMINESCENT STRUCTURE." The aforementioned related applications are hereby incorporated by reference in their entirety.

FIELD OF THE INVENTION

The present disclosure generally relates to vehicle lighting systems, and more particularly, to vehicle lighting systems employing photoluminescent structures.

BACKGROUND OF THE INVENTION

Illumination arising from photoluminescent materials offers a unique and attractive viewing experience. It is therefore desired to incorporate such photoluminescent materials in portions of vehicles to provide ambient and task lighting.

SUMMARY OF THE INVENTION

According to one aspect of the present disclosure, an illumination apparatus for a vehicle is disclosed. The apparatus comprises at least one photoluminescent portion disposed proximate a electrical panel disposed in an engine compartment. A lighting controller is in communication with a lighting device located proximate the engine compartment. The light source is configured to emit a first emission to excite the at least one photoluminescent portion.

According to another aspect of the present disclosure, an illumination system for a vehicle engine compartment is disclosed. The apparatus comprises a cover portion configured to provide access to a electrical panel. The apparatus further comprises a light source configured to emit a first emission and at least one photoluminescent portion disposed on the electrical panel. The light source is configured to excite an exterior photoluminescent portion when the cover is arranged in an open position and excite an interior photoluminescent portion when the cover is arranged in a closed position.

According to yet another aspect of the present disclosure, a lighting system for an engine compartment is disclosed. The apparatus comprises at least one photoluminescent portion disposed proximate a electrical panel. A lighting controller is in communication with a lighting source located proximate the engine compartment. The light source is configured to emit a first emission to excite the at least one photoluminescent portion. The first emission emitted from the light source is configured to excite the at least one photoluminescent portion when the electrical panel is arranged in an open position and a closed position.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

As required, detailed embodiments of the present disclosure are disclosed herein. However, it is to be understood that the disclosed embodiments are merely exemplary of the disclosure that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present disclosure.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a lighting system for a vehicle configured to illuminate at least a portion of an engine compartment. In some implementations, a light source may be configured to illuminate a first photoluminescent portion corresponding to a utility light. The light source may further be configured to illuminate a second photoluminescent portion corresponding to at least one engine compartment feature, component, fluid reservoir, and/or any other portion of the vehicle located proximate the engine compartment. In various implementations, the first photoluminescent portion may correspond to a functional lighting unit configured to illuminate the engine compartment. The second photoluminescent portion may correspond to an additional lighting unit configured to illuminate at least one engine compartment.

Figure 1:
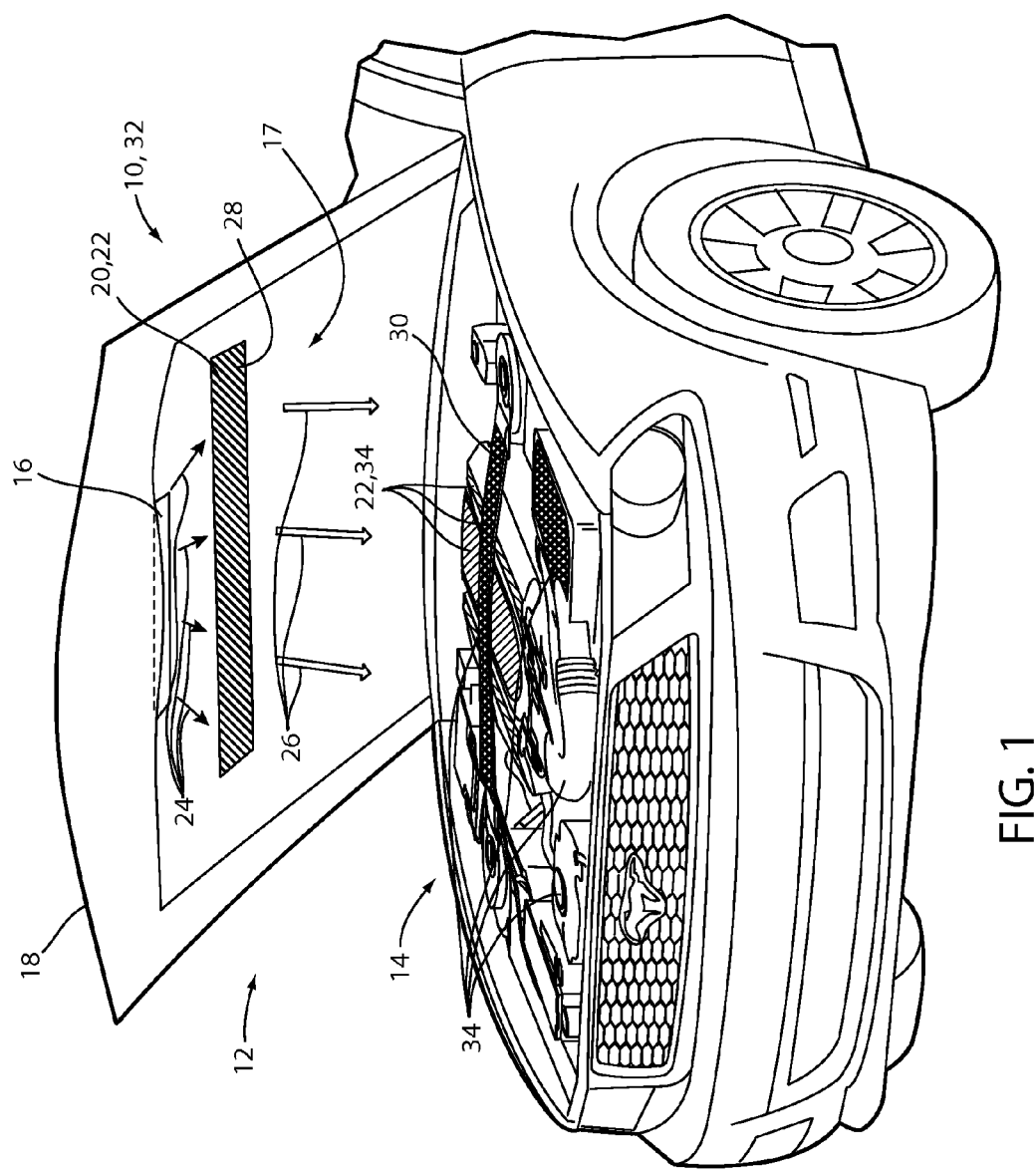
FIG. 1 is a perspective view of a vehicle comprising a lighting system.

Referring to FIG. 1, a perspective view of a vehicle 10 is shown demonstrating a lighting system 12 configured to illuminate at least a portion of an engine compartment 14. The lighting system 12 comprises a light source 16 disposed on an interior surface 17 of a hood 18 and at least one photoluminescent portion 20. In some implementations, the at least one photoluminescent portion 20 may comprise a plurality of photoluminescent portions 22. The light source 16 is configured to output a first emission 24 corresponding to a first wavelength of light. In response to receiving the light at the first wavelength, the plurality of photoluminescent portions 22 may become illuminated and emit at least a second emission 26 having a second wavelength of light longer than the first wavelength.

The plurality of photoluminescent portions 22 may correspond to any number of features located in the engine compartment 14 and disposed on the interior surface 17 incorporating at least one photoluminescent structure. In an exemplary implementation, the lighting system 12 comprises a first photoluminescent portion 28 and a second photoluminescent portion 30. The first photoluminescent portion 28 may correspond to a utility light 32 configured to emit a high intensity light to illuminate the engine compartment 14. The second photoluminescent portion 30 may correspond to at least one feature 34 located in the engine compartment. The second photoluminescent portion 30 may be configured to illuminate the at least one feature 34 to provide an ambient glow emitted from the at least one feature 34.

Each of the plurality of photoluminescent portions 22 may incorporate one or more photoluminescent structures configured to emit a specific color in response to the excitation generated in response to the first emission 24. In some implementations, a combination of photoluminescent structures may be utilized in the photoluminescent portions 22 to output various wavelengths corresponding to different colors of light. For example, in some implementations the utility light 32 may be configured to emit a combination of red light, green light, and blue light to generate a light having a substantially white appearance. The lighting system 12 may provide various benefits including a cost-effective method for illuminating an engine compartment and incorporating ambient lighting to at least one feature 34 proximate the engine compartment 14.

Figure 2A:
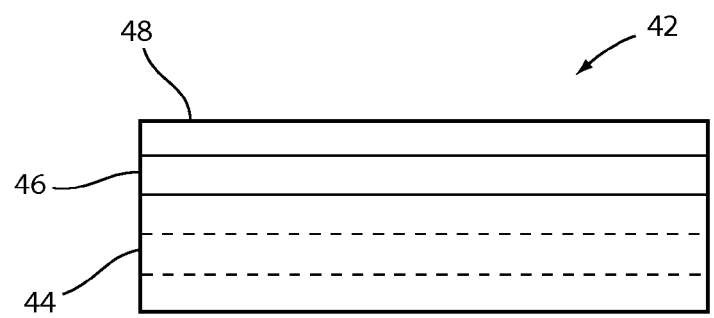
FIG. 2A is a side view of a photoluminescent structure rendered as a coating.
Figure 2B:
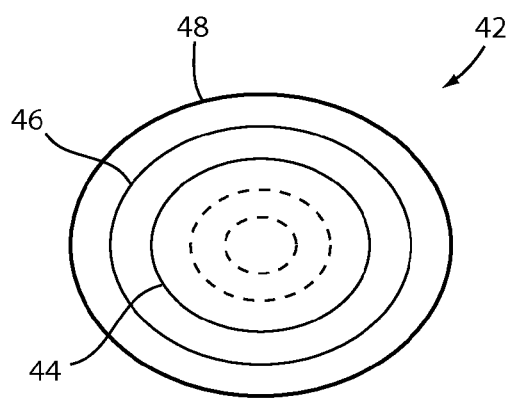
FIG. 2B a side view of a photoluminescent structure rendered as a discrete particle.
Figure 2C:
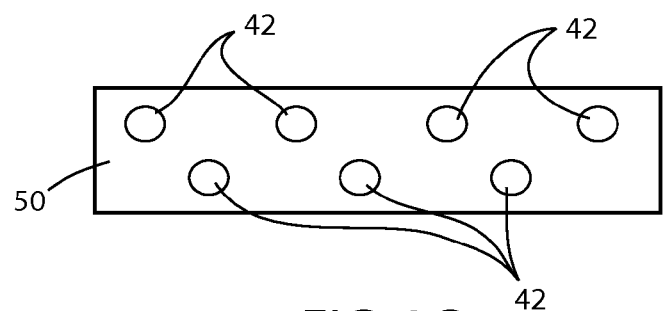
FIG. 2C a side view of a plurality photoluminescent structures rendered as discrete particles and incorporated into a separate structure.

Referring to FIGS. 2A-2C, a photoluminescent structure 42 is generally shown rendered as a coating (e.g. a film) capable of being applied to a vehicle fixture, a discrete particle capable of being implanted in a vehicle fixture, and a plurality of discrete particles incorporated into a separate structure capable of being applied to a vehicle fixture, respectively. The photoluminescent structure 42 may correspond to the photoluminescent portions as discussed herein, for example the first photoluminescent portion 28 and the second photoluminescent portion 30. At the most basic level, the photoluminescent structure 42 includes an energy conversion layer 44 that may be provided as a single layer or a multilayer structure, as shown through broken lines in FIGS. 2A and 2B.

The energy conversion layer 44 may include one or more photoluminescent materials having energy converting elements selected from a phosphorescent or a fluorescent material. The photoluminescent materials may be formulated to convert an inputted electromagnetic radiation into an outputted electromagnetic radiation generally having a longer wavelength and expressing a color that is not characteristic of the inputted electromagnetic radiation. The difference in wavelength between the inputted and outputted electromagnetic radiations is referred to as the Stokes shift and serves as the principle driving mechanism for an energy conversion process corresponding to a change in wavelength of light, often referred to as down conversion. In the various implementations discussed herein, each of the wavelengths of light (e.g. the first wavelength, etc.) correspond to electromagnetic radiation utilized in the conversion process.

Each of the photoluminescent portions may comprise at least one photoluminescent structure 42 comprising an energy conversion layer (e.g. conversion layer 44). The energy conversion layer 44 may be prepared by dispersing the photoluminescent material in a polymer matrix 50 to form a homogenous mixture using a variety of methods. Such methods may include preparing the energy conversion layer 44 from a formulation in a liquid carrier medium and coating the energy conversion layer 44 to a desired planar and/or non-planar substrate of a vehicle fixture. The energy conversion layer 44 coating may be deposited on a vehicle fixture by painting, screen printing, spraying, slot coating, dip coating, roller coating, and bar coating. Additionally, the energy conversion layer 44 may be prepared by methods that do not use a liquid carrier medium.

For example, a solid state solution (homogenous mixture in a dry state) of one or more photoluminescent materials may be incorporated in a polymer matrix 50 to provide the energy conversion layer 44. The polymer matrix 50 may be formed by extrusion, injection molding, compression molding, calendaring, thermoforming, etc. In instances where one or more energy conversion layers 44 are rendered as particles, the single or multi-layered energy conversion layers 44 may be implanted into a vehicle fixture or panel. When the energy conversion layer 44 includes a multilayer formulation, each layer may be sequentially coated. Additionally, the layers can be separately prepared and later laminated or embossed together to form an integral layer. The layers may also be coextruded to prepare an integrated multilayered energy conversion structure.

Referring back to FIGS. 2A and 2B, the photoluminescent structure 42 may optionally include at least one stability layer 46 to protect the photoluminescent material contained within the energy conversion layer 44 from photolytic and thermal degradation. The stability layer 46 may be configured as a separate layer optically coupled and adhered to the energy conversion layer 44. The stability layer 46 may also be integrated with the energy conversion layer 44. The photoluminescent structure 42 may also optionally include a protective layer 48 optically coupled and adhered to the stability layer 46 or any layer or coating to protect the photoluminescent structure 42 from physical and chemical damage arising from environmental exposure.

The stability layer 46 and/or the protective layer 48 may be combined with the energy conversion layer 44 to form an integrated photoluminescent structure 42 through sequential coating or printing of each layer, or by sequential lamination or embossing. Alternatively, several layers may be combined by sequential coating, lamination, or embossing to form a substructure. The substructure may then be laminated or embossed to form the integrated photoluminescent structure 42. Once formed, the photoluminescent structure 42 may be applied to a chosen vehicle fixture.

In some implementations, the photoluminescent structure 42 may be incorporated into a vehicle fixture as one or more discrete multilayered particles as shown in FIG. 2C. The photoluminescent structure 42 may also be provided as one or more discrete multilayered particles dispersed in a polymer formulation that is subsequently applied to a vehicle fixture or panel as a contiguous structure. Additional information regarding the construction of photoluminescent structures to be utilized in at least one photoluminescent portion of a vehicle is disclosed in U.S. Pat. No. 8,232,533 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Nov. 8, 2011, the entire disclosure of which is incorporated herein by reference.

Figure 3:
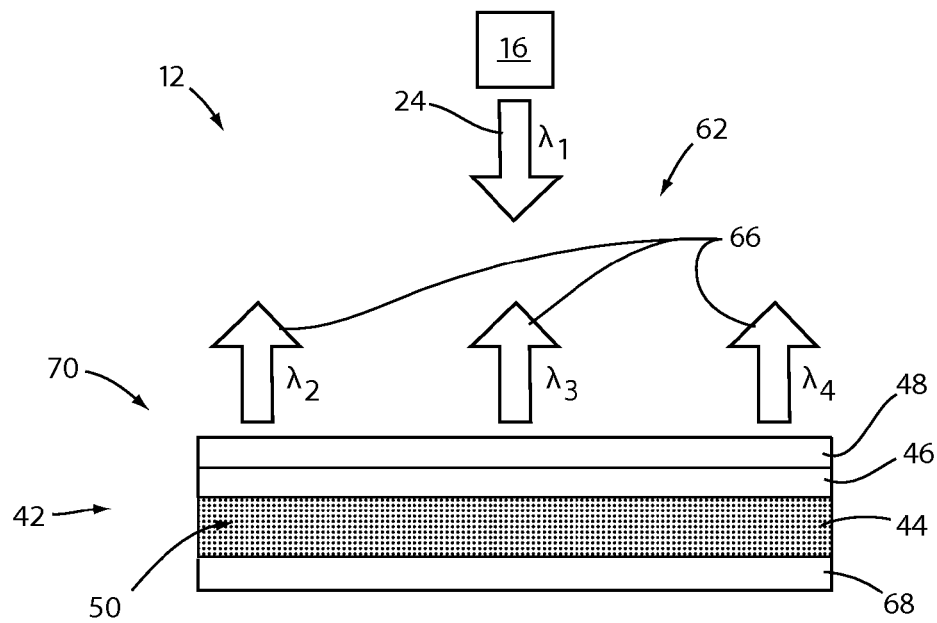
FIG. 3 illustrates a vehicle lighting system configured to convert a first emission of light to a second emission of light.

Referring to FIG. 3, the lighting system 12 is generally shown according to a front-lit configuration 62 to convert the first emission 24 from the light source 16 to the second emission 26. The first emission 24 comprises a first wavelength $\lambda_1$, and the second emission 26 comprises a second wavelength $\lambda_2$. The lighting system 12 may include the photoluminescent structure 42 rendered as a coating and applied to a substrate 68 of a vehicle fixture 70. The photoluminescent structure 42 may include the energy conversion layer 44, and in some implementations may include the stability layer 46 and/or protective layer 48. In response to the light source 16 being activated, the first emission 24 is converted from the first wavelength $\lambda_1$ to the second emission 26 having at least the second wavelength $\lambda_2$. The second emission 26 may comprise a plurality of wavelengths $\lambda_2$, $\lambda_3$, $\lambda_4$ configured to emit significantly white light from the vehicle fixture 70.

In various implementations, the lighting system 12 comprises at least one energy conversion layer 44 configured to convert the first emission 24 at the first wavelength $\lambda_1$ to the second emission 26 having at least the second wavelength $\lambda_2$. In order to generate the plurality of wavelengths $\lambda_2$, $\lambda_3$, $\lambda_4$, the energy conversion layer 44 may comprise a red-emitting photoluminescent material, a green-emitting photoluminescent material, and a blue-emitting photoluminescent material dispersed in the polymer matrix 50. The red, green, and blue-emitting photoluminescent materials may be combined to generate the significantly white light for the second emission 26. Further, the red, green, and blue-emitting photoluminescent materials may be utilized in a variety of proportions and combinations to control the color of the second emission 26.

Each of the photoluminescent materials may vary in output intensity, output wavelength, and peak absorption wavelengths based on a particular photochemical structure and combinations of photochemical structures utilized in the energy conversion layer 44. As an example, the second emission 26 may be changed by adjusting the wavelength of the first emission $\lambda_1$ to activate the photoluminescent materials at different intensities to alter the color of the second emission 26. In addition to or alternatively to the red, green, and blue-emitting photoluminescent materials, other photoluminescent materials may be utilized alone and in various combinations to generate the second emission 26 in a wide variety of colors. In this way, the lighting system 12 may be configured for a variety of applications to provide a desired lighting color and effect for the vehicle 10.

The light source 16 may also be referred to as an excitation source and is operable to emit at least the first emission 24. The light source 16 may comprise any form of light source, for example halogen lighting, fluorescent lighting, light emitting diodes (LEDs), organic LEDs (OLEDs), polymer LEDs (PLEDs), solid state lighting or any other form of lighting configured to output the first emission 24. The first emission 24 from the light source 16 may be configured such that the first wavelength $\lambda_1$ corresponds to at least one absorption wavelength of the one or more photoluminescent materials of the energy conversion layer 44. In response to receiving the light at the first wavelength $\lambda_1$, the energy conversion layer 44 may be excited and output the one or more output wavelengths $\lambda_2$, $\lambda_3$, $\lambda_4$. The first emission 24 provides an excitation source for the energy conversion layer 44 by targeting absorption wavelengths of the various photoluminescent materials utilized therein. As such, the lighting system 12 is configured to output the second emission 26 to generate a desired light intensity and color.

Though the plurality to wavelengths is referred to as the wavelengths $\lambda_2$, $\lambda_3$, $\lambda_4$, the photoluminescent materials may be combined in various proportions, types, layers, etc. to generate a variety of colors for the second emission 26. The photoluminescent materials may also be utilized in a plurality of photoluminescent portions distributed along a path of the first emission 24 to generate any number of emissions, for example a third emission, a fourth emission, etc. The third emission may be emitted from the second photoluminescent portion 30 and the fourth emission may be emitted from a third photoluminescent portion disposed on the vehicle 10.

In an exemplary implementation, the light source 16 comprises an LED configured to emit the first wavelength $\lambda_1$ which corresponds to a blue spectral color range. The blue spectral color range comprises a range of wavelengths generally expressed as blue light (~440-500 nm). In some implementations, the first wavelength $\lambda_1$ may also comprise wavelengths in a near ultraviolet color range (~390-450 nm). In an exemplary implementation, $\lambda_1$ may be approximately equal to 470 nm. In some implementations, the first wavelength $\lambda_1$ may be approximately less than 500 nm such that the first wavelength of the light is not significantly visible.

The blue spectral color range and shorter wavelengths may be utilized as an excitation source for the lighting system 12 due to these wavelengths having limited perceptual acuity in the visible spectrum of the human eye. By utilizing shorter wavelengths for the first wavelength $\lambda_1$, and converting the first wavelength with the conversion layer 44 to at least one longer wavelength, the lighting system 12 creates a visual effect of light originating from the photoluminescent structure 42. In this configuration, light is emitted from the photoluminescent structure 42 (e.g. the first photoluminescent portion 28, the second photoluminescent portion 30) from locations of the vehicle 10 that may be inaccessible or costly to add conventional light sources requiring electrical connections.

As discussed herein, each of the plurality of wavelengths $\lambda_2$, $\lambda_3$, $\lambda_4$ may correspond to a significantly different spectral color range. The second wavelength $\lambda_2$ may correspond to the excitation of a red-emitting photoluminescent material having a wavelength of approximately 620-750 nm. The third wavelength $\lambda_3$ may correspond to the excitation of a green emitting photoluminescent material having a wavelength of approximately 526-606 nm. The fourth wavelength $\lambda_4$ may correspond to a blue or blue green emitting photo luminescent material having a wavelength longer than the first wavelength $\lambda_1$ and approximately 430-525 nm. Though the wavelengths $\lambda_2$, $\lambda_3$, $\lambda_4$ are discussed herein as being utilized to generate a significantly white light, various combinations of photoluminescent materials may be utilized in the conversion layer 44 to convert the first wavelength $\lambda_1$ to one or more wavelengths corresponding to a variety of colors.

Figure 4:
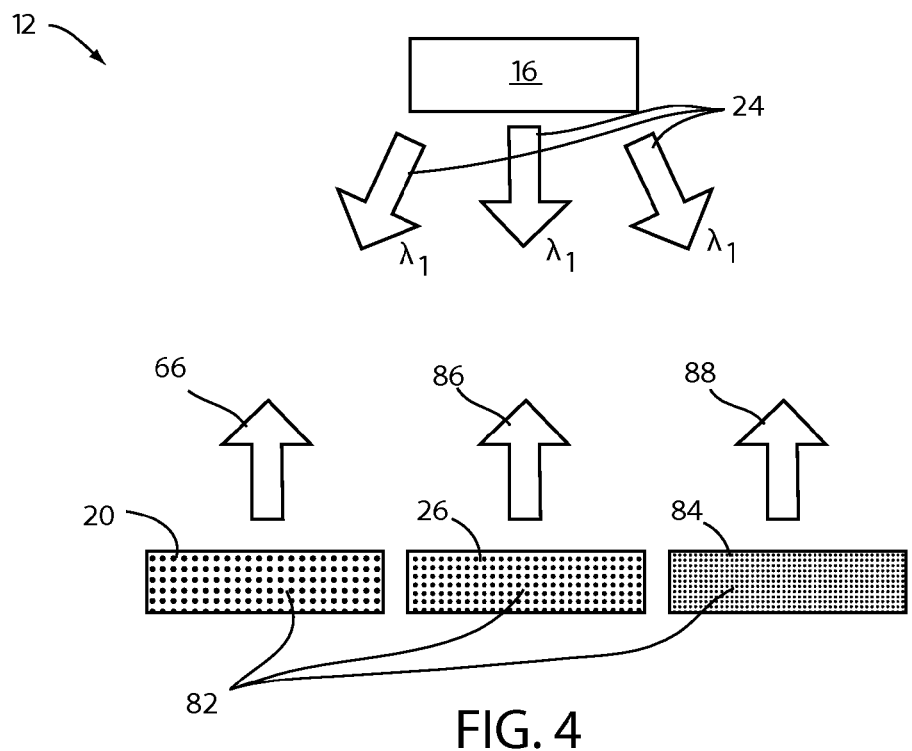
FIG. 4 illustrates the vehicle lighting system configured to convert a first emission of light to a plurality of emissions of light.

Referring to FIG. 4, the lighting system 12 is shown in a front-lit configuration. In an exemplary implementation, the light source 16 may be configured to emit the first emission 24 toward the plurality of photoluminescent portions 82. In this example, the plurality of photoluminescent portions 22 comprises the first photoluminescent portion 28, the second photoluminescent portion 30, and a third photoluminescent portion 84. Each of the photoluminescent portions 28, 30, 84 may be configured to convert the first wavelength $\lambda_1$ of the first emission 24 to one or more of the plurality of wavelengths $\lambda_2$, $\lambda_3$, $\lambda_4$. In this way, the first emission 24 may be converted into a plurality of emissions originating from each of the photoluminescent portions 82 to generate a multicolored lighting effect.

For example, the first photoluminescent portion 28 may comprise photoluminescent materials in a conversion layer configured to generate the second emission 26. The second photoluminescent portion 30 may comprise photoluminescent materials in a conversion layer configured to generate a third emission 86. The third photoluminescent portion 84 may comprise photoluminescent materials in a conversion layer configured to generate a fourth emission 88. Similar to the energy conversion layer 44, discussed in reference to FIG. 3, photoluminescent materials configured to emit light of various colors may be utilized in a variety of proportions and combinations to control the output color of each of the second emission 66, the third emission 86, and the fourth emission 88. Based on a desired lighting effect, each of the emissions 26, 86, 88 may comprise photoluminescent material configured to emit light having substantially similar colors, or a wide variety of color combinations.

To achieve the various colors and combinations of photoluminescent materials described herein, the lighting system 12 may utilize any form of photoluminescent materials, for example phospholuminescent materials, organic and inorganic dyes, etc. For additional information regarding fabrication and utilization of photoluminescent materials to achieve various emissions, refer to U.S. Pat. No. 8,207,511 to Bortz et al., entitled "PHOTOLUMINESCENT FIBERS, COMPOSITIONS AND FABRICS MADE THEREFROM," filed Jun. 5, 2009; U.S. Pat. No. 8,247,761 to Agrawal et al., entitled "PHOTOLUMINESCENT MARKINGS WITH FUNCTIONAL OVERLAYERS," filed Oct. 19, 2011; U.S. Pat. No. 8,519,359 B2 to Kingsley et al., entitled "PHOTOLYTICALLY AND ENVIRONMENTALLY STABLE MULTILAYER STRUCTURE FOR HIGH EFFICIENCY ELECTROMAGNETIC ENERGY CONVERSION AND SUSTAINED SECONDARY EMISSION," filed Mar. 4, 2013; U.S. Pat. No. 8,664,624 B2 to Kingsley et al., entitled "ILLUMINATION DELIVERY SYSTEM FOR GENERATING SUSTAINED SECONDARY EMISSION," filed Nov. 4, 2012; U.S. Patent Publication No. 2012/0183677 to Agrawal et al., entitled "PHOTOLUMINESCENT COMPOSITIONS, METHODS OF MANUFACTURE AND NOVEL USES," filed Mar. 29, 2012; U.S. Patent Publication No. 2014/0065442 A1 to Kingsley et al., entitled "PHOTOLUMINESCENT OBJECTS," filed Oct. 23, 2012; and U.S. Patent Publication No. 2014/0103258 A1 to Agrawal et al., entitled "CHROMIC LUMINESCENT COMPOSITIONS AND TEXTILES," filed Dec. 19, 2013, all of which are incorporated herein by reference in their entirety.

Figure 5:
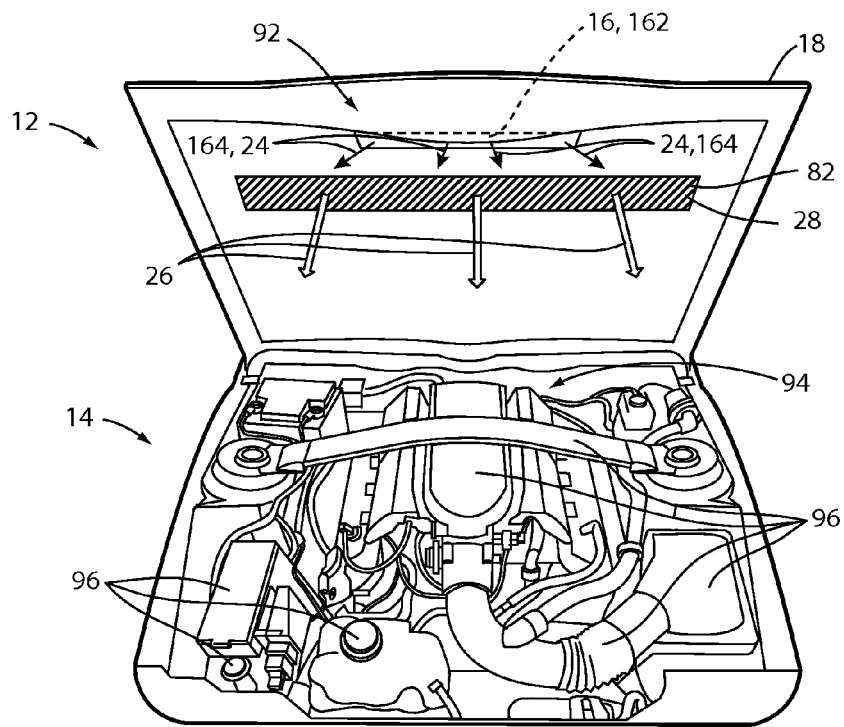
FIG. 5 is a perspective view of a vehicle having a lighting system configured to illuminate an engine compartment.
Figure 6:
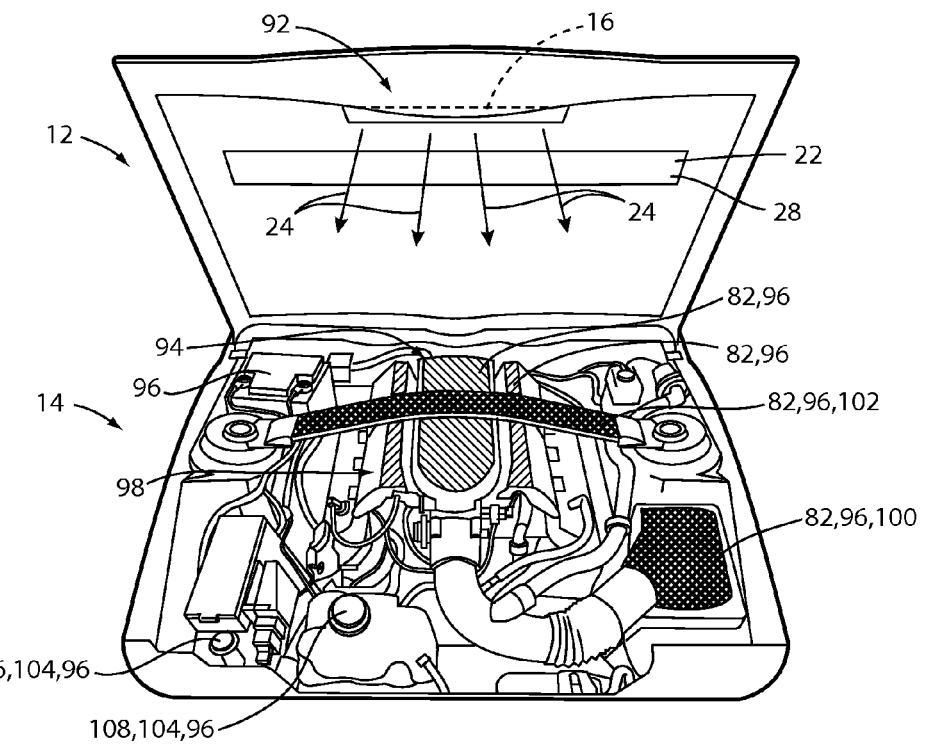
FIG. 6 is a perspective view of a vehicle having a lighting system configured to illuminate at least one engine component in an engine compartment.

Referring to FIGS. 5 and 6, the engine compartment 14 of the vehicle 10 is shown demonstrating the plurality of photoluminescent portions 22. For clarity, the first photoluminescent portion 28 disposed on the interior surface 17 is shown in reference to FIG. 5 and the plurality of photoluminescent portions 82 disposed in the engine compartment 14 are shown in FIG. 6. It shall be understood that the photoluminescent portions 82 as discussed herein may be distributed in any configuration throughout the interior surface 17 of the hood 18 and the engine compartment 14. As discussed herein, the first photoluminescent portion 28 may be configured as a utility light 32 to illuminate the engine compartment 14 for maintenance and inspection. In response to the hood 18 being oriented in an open position, a lighting control module of the vehicle 10 may be configured to activate the light source 16. Further, in response to the activation of the light source 16, the first emission 24 may be activated to emit light having the first wavelength $\lambda_1$.

The light source 16 may comprise a plurality of LEDs configured to emit the first emission at the first wavelength $\lambda_1$. In some implementations, the light source 16 may comprise an array of LEDs located proximate a forward portion 92 of the hood 18. By positioning the light source 16 proximate the forward portion 92, the light source 16 may experience a lower intensity of heat during operation of the vehicle 10. For example, when the hood 18 is oriented in a closed position, the light source 16 may be located proximate a radiator or cooling source of the engine such that the light source 16 is not damaged by heat radiating from an engine compartment 14 of the vehicle 10.

As illustrated in FIG. 5, the light source 16 is configured to direct the first emission 24 substantially toward the first photoluminescent portion 28. Further, the first emission 24 may be directed downward toward the engine compartment 14 when the hood 18 is oriented in the open position. For example, the light source 16 may be connected to the interior surface 17 such that the first emission is directed substantially downward, focused centrally at the engine compartment 14. The light source 16 may further be configured to project the first emission 24 toward the first photoluminescent portion 28 and the engine compartment 14 via one or more optic lenses or devices. In this configuration, the first emission 24 at the first wavelength $\lambda_1$ is emitted from the light source 16 to substantially illuminate the first photoluminescent portion 28 disposed on the hood 18 to illuminate the engine compartment 14.

Though the first emission may be directed through a substantially open volumetric space between the hood 18 and the engine compartment 14, the illumination of the light at the first wavelength $\lambda_1$ may be limited perceptually. The limited visible or perceptible illumination of the first wavelength $\lambda_1$ may be due to the first wavelength $\lambda_1$ being in the blue or near UV spectral color ranges. Due to the limited sensitivity of the human eye to light at such short wavelengths (e.g. blue colored light), the first emission may go unnoticed to an onlooker of the lighting system 12. In this way, each of the plurality of photoluminescent portions 22 may be illuminated such that the activation source of the photoluminescent portions 22 is not apparent to provide a sophisticated ambient lighting experience.

In response to the first wavelength $\lambda_1$ of the first emission 24 being received by the first photoluminescent portion 28, the energy conversion layer 44 may become excited and emit the second emission 26. As discussed previously herein, the second emission 26 may comprise a plurality of wavelengths $\lambda_2$, $\lambda_3$, $\lambda_4$ to generate a significantly white light. The second emission 26 is generally directed toward the engine compartment 14 such that a plurality of features 96 is illuminated. The utility light 32 configuration of the first photoluminescent portion 28 may provide uniform lighting throughout the engine compartment 14.

Referring now to FIG. 6, the first emission 24 is further directed from the light source 16 downward into the engine compartment 14 to excite a conversion layer 44 in one or more photoluminescent portions 82 applied as a coating to and/or disposed in a matrix (e.g. the polymer matrix 50) of any number of the plurality of features 96. For example, the second photoluminescent portion 30 may be incorporated in an engine cover 98; the third photoluminescent portion 84 may be incorporated in an air intake 100 and a strut tower brace 102. In response to receiving the first emission 24 comprising the first wavelength $\lambda_1$, each of the plurality of photoluminescent portions 82 may become excited. The excitation may cause the second photoluminescent portion 30 to emit the third emission 86 and the third photoluminescent portion 84 to emit the fourth emission 88. For clarity, various details corresponding to the first photoluminescent portion 28 are suppressed in FIG. 6.

Though the plurality of photoluminescent portions 82 are specifically discussed in reference to three exemplary portions, the plurality of photoluminescent portions 82 may corresponds to any number of portions proximate the engine compartment according to other embodiments. Each of the plurality of photoluminescent portions 82 may further include various energy conversion layers including various photoluminescent materials configured to emit a wide variety of colors in response to the first emission 24. As such, the lighting system 12 may be utilized in a variety of settings to provide the utility light 32 and/or illuminate and accent any number of features 96.

The plurality of features 96 may comprise any feature related to the vehicle 10 that may be disposed generally proximate the engine compartment 14 and the hood 18. Any of the plurality of features 96 may incorporate a photoluminescent structure applied as a coating, and/or dispersed in a material structure that may illuminate and emit light in response to receiving the first wavelength $\lambda_1$ of the first emission 24. Each of the photoluminescent portions 82 may be illuminated in a single color or multiple colors to provide a desired color pallet and appearance for illuminating the plurality of features 94. The photoluminescent portions 82 may further be utilized to identify one or more of the plurality of features 94 for easy identification during maintenance.

In some implementations, at least one fluid fill cap 104, dip stick, or any other feature 94 may comprise at least one photoluminescent structure 42 configured to emit an emission (e.g. the third emission 86, fourth emission 88, etc.) comprising an identifying color. The identifying color may be emitted in response to the feature 94 receiving the first emission 24. The identifying color may be configured to correspond to a color described in a vehicle user manual or maintenance instructions. In some implementations, the plurality of the photoluminescent portions 82 may correspond to a plurality of identifying colors configured to identify, categorize, and/or provide for a first feature 106 having a first color to be visually discernible from a second feature 108 having a second color. In this way, the lighting system may provide additional utility by providing decorative lighting that may serve to aid in identifying various features 94 located proximate the engine compartment 14.

Figure 7:
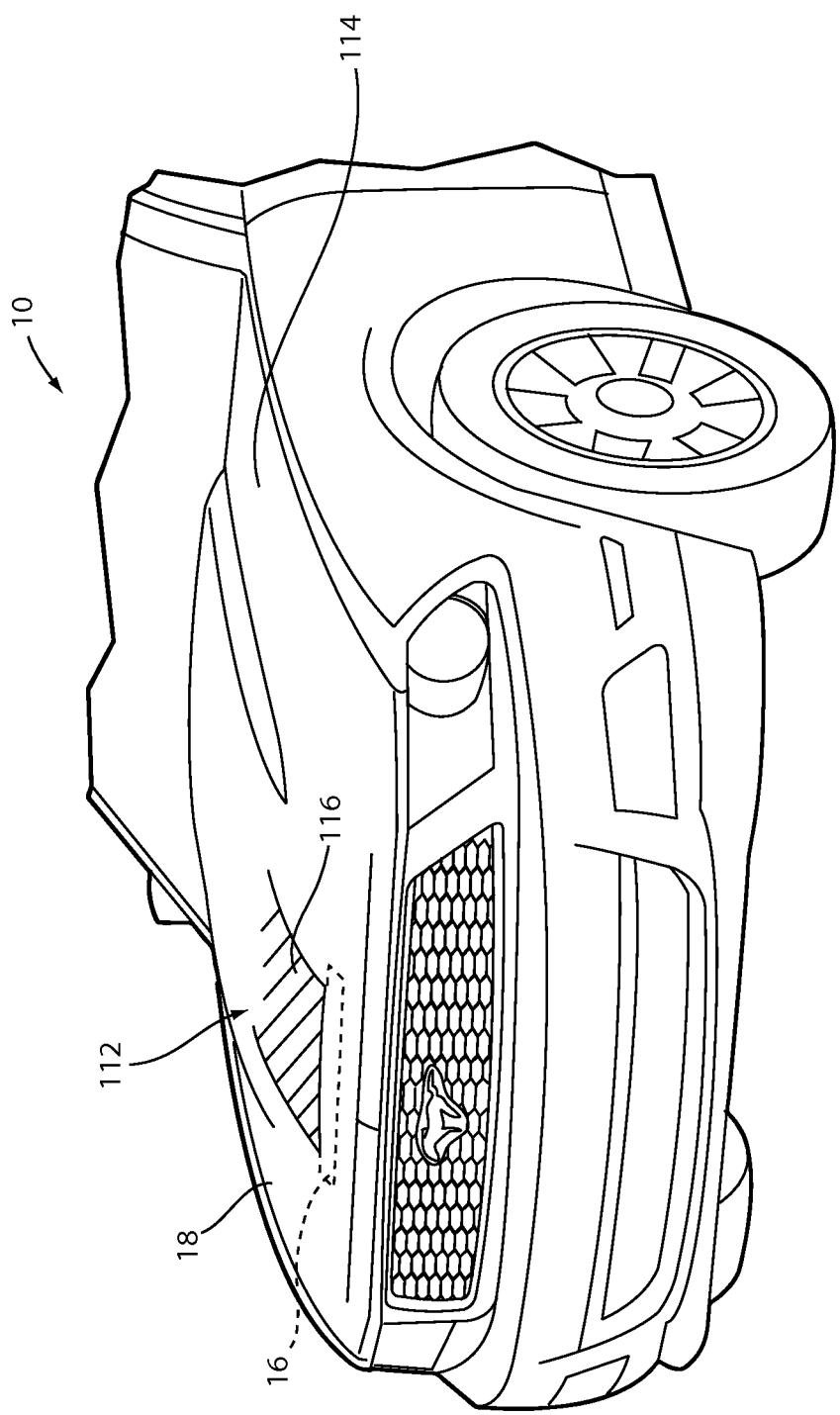
FIG. 7 is a perspective view of a vehicle having a lighting system configured to illuminate at least a portion of a hood of a vehicle.

Referring now to FIG. 7, a perspective view of the vehicle 10 is shown demonstrating a hood light 112 of the lighting system 12. In some implementations, a portion of the first emission 24 may be directed from the light source 16 to an outer surface 114 of the hood 18. At least a portion of the outer surface 114 of the hood 18 may include an exterior photoluminescent portion 116 disposed in a coating, paint layer, vehicle panel, or any portion of the hood 18. In such implementations, the lighting system 12 may be further configured to provide lighting for the exterior of the vehicle 10.

A portion of the first emission 24 may be directed from the light source 16 through an opening in the hood 18. In some implementations, a light pipe, tube, or any form of optic device may be configured to direct a portion of the first emission 24 from the light source 16 to the exterior photoluminescent portion 116. In response to receiving the first emission 24, the exterior photoluminescent portion 116 may become excited and illuminate the hood light 112. As discussed previously in reference the plurality of photoluminescent portions 82, the exterior photoluminescent portion 116 may be illuminated in a wide variety of colors. In order to control the light source 16 for operation of the hood light 112, the lighting control module of the vehicle 10 may be configured to selectively activate the light source 16.

The lighting system 12 as described herein provides various benefits including a cost-effective system operable to provide ambient lighting for the engine compartment 14 of the vehicle 10. The various implementations described herein, including the particular locations and configurations of each of the photoluminescent portions, may vary without departing from the spirit of the disclosure. The disclosure provides various lighting systems and methods that may improve the appearance of the engine compartment 14 and further provide light to illuminate the engine compartment 14 to improve visibility for maintenance and inspection.

Figure 8:
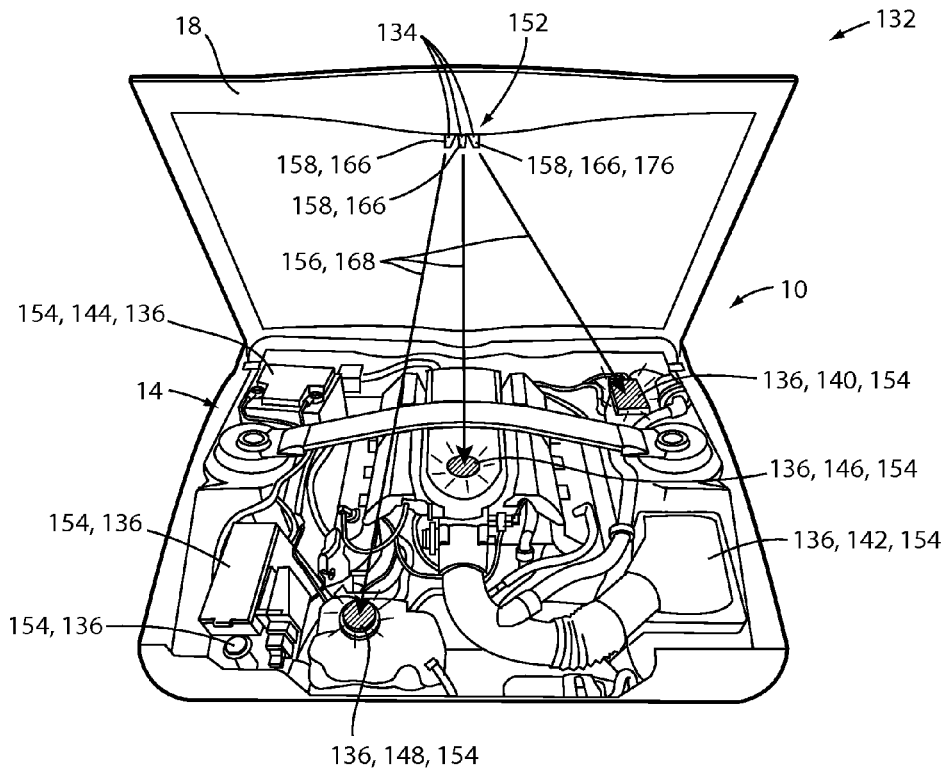
FIG. 8 is a perspective view of a vehicle having a lighting system configured to selectively illuminate at least one feature disposed proximate an engine compartment to identify a location of the feature.

Referring now to FIG. 8, a lighting system 132 may incorporate similar elements and features to the lighting system 12. The lighting system 132 may comprise a lighting controller in communication with a vehicle control module, for example an engine control unit, a vehicle maintenance system, an integrated control system, or any other system operable to report an engine maintenance, service, or vehicle alert. The vehicle control module may be operable to identify a maintenance, service, or any form of event that may require an operator of the vehicle 10 to access the engine compartment 14. The vehicle control module may further be operable to communicate a signal to the lighting controller indicating at least one light source 134 to activate. The lighting controller in communication with the vehicle control module is further discussed in reference to FIG. 10.

In response to receiving a signal from vehicle control module, the lighting controller may be operable to activate the at least one light source 134 corresponding to a region of interest located in the engine compartment 14. The region of interest may correspond to at least one feature 136 located proximate the engine compartment 14. As discussed herein, a feature 136 may correspond to any component, accessory, or part located proximate the engine compartment 14. For example, the feature 136 may correspond to a fluid reservoir, a electrical panel 140, air filter housing 142, a battery 144, or any other component or object located proximate the engine compartment 14. The fluid reservoir may correspond to an engine oil inlet 146, a washer fluid reservoir 148, a brake fluid reservoir, a coolant reservoir, etc. By activating the at least one light source 134, the lighting controller may be operable to activate the at least one light source 134 to illuminate a specific feature or features corresponding to at least one region of interest located proximate the engine compartment 14.

In some implementations, the light source 134 may correspond to one of a plurality of light sources or light emitters that may form a lighting device 152. For example, the lighting device 152 may comprise a plurality of light sources or emitters corresponding to the at least one light source 134. The lighting controller may be operable to selectively activate each of light sources 134 in response to receiving a signal from the vehicle control unit. The signal may identify a specific light source of the plurality of light sources 134 for the lighting controller to activate. In response to receiving the signal, the lighting controller may activate at least one of the light sources 134 as identified by the signal. In this way, the lighting controller may activate at least one light source of the lighting device 152 to illuminate a region of interest corresponding to the feature 136 identified by the vehicle control module.

In some implementations, an operator of the vehicle 10 may utilize an interface, for example a human machine interface (HMI), to select at least one feature 136 such that the system 132 illuminates the feature 136 to identify a location of the feature proximate the engine compartment 14. In such implementations, the operator of the vehicle 10 may utilize the interface to interact with the vehicle control module. The interface may be configured to display a list of features 136 that may be illuminated by the system 132. Upon receiving a selection of a particular feature, the interface may communicate the feature to the vehicle control module such that the control module may provide the signal to the lighting controller. In response to receiving the signal from the vehicle control module, the lighting controller may activate at least one light source of the plurality of light sources 134 to illuminate the region of interest corresponding at least one feature of the plurality of features 136.

The at least one light source 134 may be configured similar to the light source 16 and configured to illuminate at least one photoluminescent portion 154 corresponding to a feature disposed proximate the engine compartment 14. The at least one photoluminescent portion 154 may correspond to a plurality of photoluminescent portions disposed proximate each of the plurality of features 136. For example, the at least one photoluminescent portion 154 may correspond to a plurality of photoluminescent portions disposed on at least a portion of each of the plurality of features 136. In this configuration, the lighting device 152 may be configured to selectively illuminate each light source 134 to emit an excitation emission 156. The excitation emission 156 may correspond to light in the blue spectral color range configured to illuminate the at least one photoluminescent portion 154 such that a feature of the plurality of features 136 is illuminated for convenient identification.

The lighting device 152 may be operable to emit an excitation emission 156, similar to the first emission 24. The excitation emission 156 may be in the blue spectral color range comprising a range of wavelengths generally expressed as blue light (~440-500 nm). In some implementations, the first wavelength $\lambda_1$ may also comprise wavelengths in a near ultraviolet color range (~390-450 nm). In an exemplary implementation, $\lambda_1$ may be approximately equal to 440 nm. In some implementations, the first wavelength $\lambda_1$ may be approximately less than 500 nm such that the first wavelength of the light is not significantly visible.

The at least one photoluminescent portion 154 may correspond to a coating, lettering, symbol, design, and/or component of an assembly or any portion disposed proximate the at least one feature 136. In operation, the system 132 is operable to direct the excitation emission 156 toward the at least one feature 136. In some implementations, the lighting device 152 may comprise at least one directional optic 158 configured to direct the excitation emission to a specific region proximate the engine compartment 14 such that a specific photoluminescent portion of the plurality of photoluminescent portions 154 is illuminated. The specific photoluminescent portion may correspond to one or more of the plurality of features 136 as identified in the signal received by the lighting controller from the vehicle control module.

Referring now to FIGS. 5 and 8, in some implementations, the lighting system 132 may be implemented alone or in combination with the first photoluminescent portion 28 and the light source 16. In such implementations, the light source 16, referred to as the first excitation light source 162 for clarity, may be configured to emit the first excitation emission 164 corresponding to the first emission 24 at a wavelength of approximately 480 nm. The at least one light source 134, referred to as the second excitation light source 166 for clarity, may be configured to emit a second excitation emission 168 corresponding to the excitation emission 156 at a wavelength of approximately 440 nm. In this configuration, the energy conversion layer 44 of the plurality of photoluminescent portions 22 may be configured to be excited by the first excitation emission 164 having a wavelength of approximately 480 nm. The energy conversion layer 44 of the at least one photoluminescent portion 154 may be configured to be excited by the second excitation emission 168 having a wavelength of approximately 440 nm. In this configuration, the system 132 may be operable to selectively illuminate the plurality of photoluminescent portions 22 or the at least one photoluminescent portion 154 substantially independently.

For example, the lighting controller may be in communication with each of the first excitation light source 162 and the second excitation light source 166 of the lighting device 152. The lighting controller may be operable to selectively activate the first excitation light source 162 or the second excitation light source 166 to selectively illuminate the plurality of photoluminescent portions 22 or the at least one photoluminescent portion 154, respectively. In this configuration, the system 132 may also be operable to illuminate the engine compartment 14 by activating the first excitation light source 162 and further illuminate at the at least one feature 136 by activating the second excitation light source 166.

In order to provide for substantially independent illumination of the plurality of photoluminescent portions 22 and the at least one photoluminescent portion 154, the corresponding energy conversion layers may be configured to have excitation absorption ranges corresponding to the wavelength emitted by the first excitation light source 162 and the second excitation light source 166, respectively. For example, specific photoluminescent materials may be selected such that the plurality of photoluminescent portions 22 comprise a first peak absorption at a wavelength of approximately 480 nm. Photoluminescent materials may also be selected such that the at least one photoluminescent portion 154 comprises a second peak absorption at a wavelength of approximately 440 nm. In this configuration, the system 132 may be configured to selectively illuminate the first photoluminescent portion 28 and the at least one photoluminescent portion 154 substantially independently. Though the specific wavelengths of 440 nm and 480 nm are discussed in reference to the present implementation, it shall be understood that photoluminescent materials having various absorption ranges may be utilized to adjust the absorption ranges of the plurality of photoluminescent portions 22 and the at least one photoluminescent portion 154.

Figure 9:
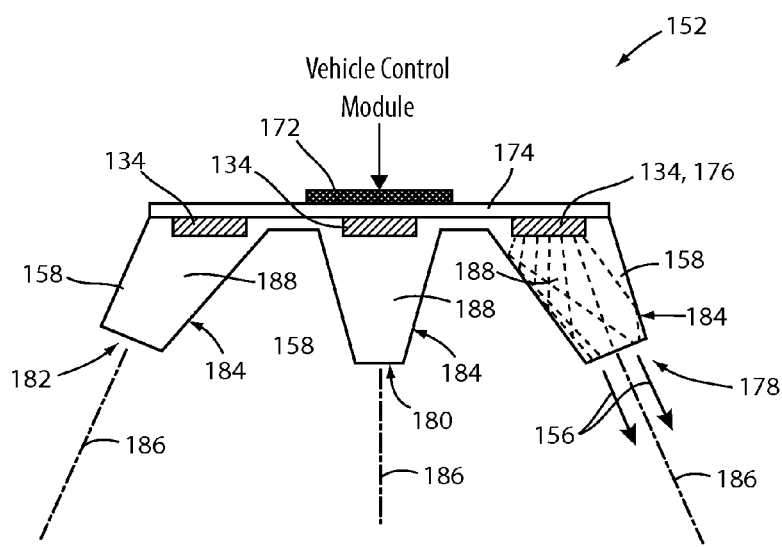
FIG. 9 is a detailed side view of a lighting device configured to selectively illuminate at least one feature disposed proximate an engine compartment.

Referring now to FIG. 9, the lighting device 152 is shown, demonstrating a plurality of directional optics 158. In some embodiments, the lighting device 152 may comprise an assembly, which may incorporate the lighting controller 172 in communication with the plurality of light sources 134 via at least one circuit 174. The circuit 174 may correspond to a printed circuit board. The lighting controller 172 is in communication with the vehicle control module such that the lighting controller 172 may receive signals from the vehicle control module identifying a specific light source or emitter of lighting device 152. Upon receiving a signal from the vehicle control module, the lighting controller 172 may selectively activate one or more of the plurality of light sources 134 to direct the excitation emission 156 toward one or more of the features 136 via the directional optics 158 to illuminate a region of interest proximate the engine compartment 14.

Referring now to FIGS. 8 and 9, in operation, the vehicle control module may identify that a fuse located in the electrical panel 140 is damaged and requires replacement. The electrical panel 140 may correspond to a fuse panel, a cabinet, enclosure, or any portion of the vehicle configured to receive an electrical circuit or component. Upon opening the hood 18 of the vehicle 10, the vehicle control module may identify that the engine compartment 14 is being accessed. In response to the hood 18 of the vehicle being ajar, the vehicle control module may communicate a signal to the lighting controller 172 instructing the lighting controller to activate a specific light source 176 configured to illuminate the electrical panel 140. In response to receiving the signal from the vehicle control module, the lighting controller 172 may activate the specific light source 176 such that the excitation emission 156 is emitted toward the electrical panel 140 in a first direction 178 via one of the directional optics 158.

In response to receiving the excitation emission 156, the photoluminescent portion 154 disposed proximate the electrical panel 140 may become excited and illuminate at least a portion of the electrical panel 140. In this way, the electrical panel 140 may be easily identifiable when viewing the engine compartment 14 due to the light emitted from the excited photoluminescent portion 154. The excitation emission 156 may be directed in any of a plurality of directions substantially toward any of the features 136 proximate the engine compartment 14. For example, the excitation emission may be directed in one or more of the first direction 178, a second direction 180, and/or a third direction 182. Each of the directions 178, 180, 182 may be directed toward one or more of the features 136 such that the lighting controller 172 may be operable to selectively illuminate one or more of the features 136.

Each of the light sources 134 or light emitters may correspond to any form of light source, for example halogen lighting, fluorescent lighting, light emitting diodes (LEDs), organic LEDs (OLEDs), polymer LEDs (PLEDs), solid state lighting or any other form of lighting configured to output the excitation emission 156. The directional optics 158 may be of polymeric material, for example acrylic material, that may be molded to form a substantially conical shape 184 defining a light emitting axis 186 that may be directed at a specific feature of the plurality of features 136. Each of the directional optics 158 may be configured to emit the excitation emission 156 via a total internal reflective body 188. In this configuration, the lighting device 152 may be configured to direct the excitation emission 156 substantially toward any location proximate the engine compartment 14 to illuminate at least one of the features 136.

Figure 10:
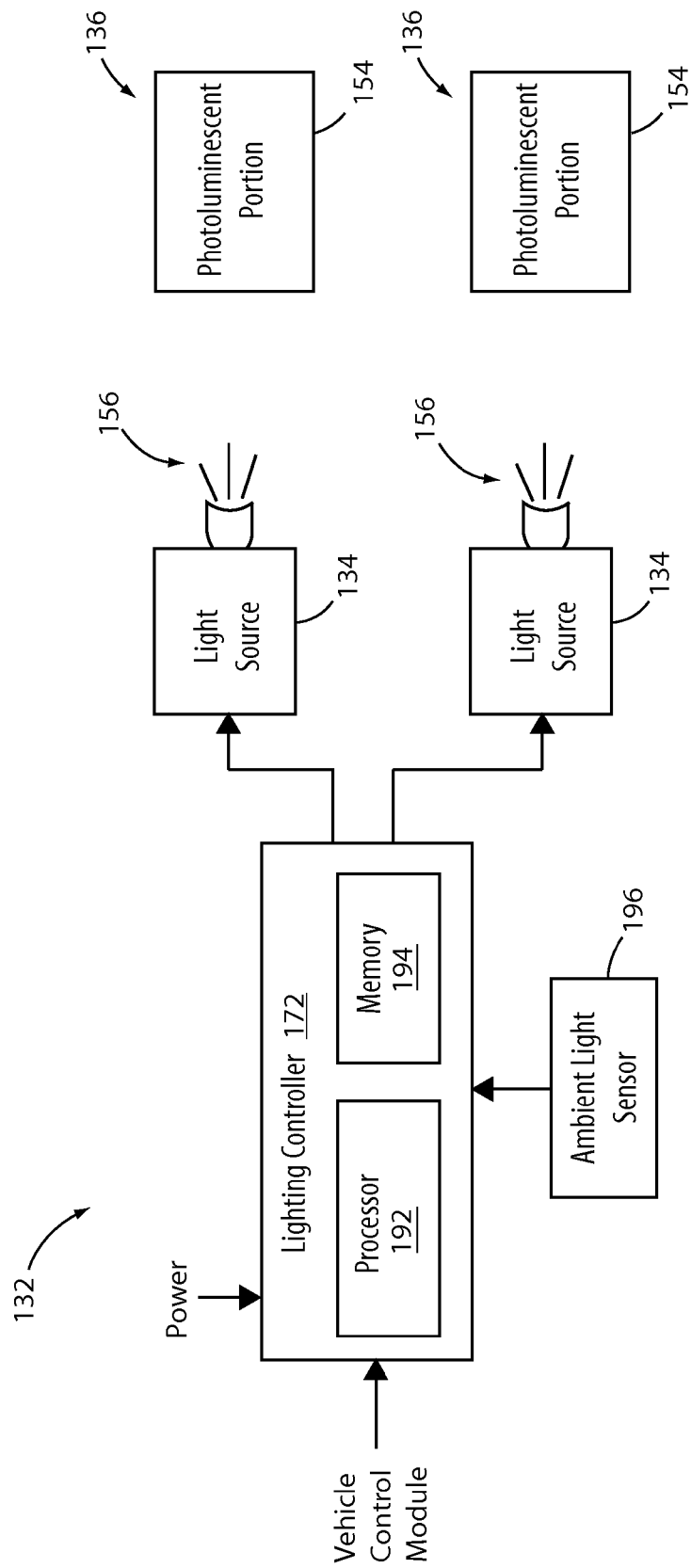
FIG. 10 is a block diagram of a lighting system in communication with a vehicle control module and configured to selectively illuminate at least one feature disposed proximate an engine compartment.

Referring now to FIG. 10, a block diagram of the lighting system 132 further illustrates the lighting controller 172 is shown. The lighting controller 172 is in communication with the vehicle control module such that the lighting controller 172 may receive signals identifying at least one light source of the plurality of light sources 134. In response to the signal, the lighting controller 172 may activate one or more light source of the plurality of light sources 134 to emit the excitation emission 156 to excite a photoluminescent portion 154. The lighting controller 172 is configured to selectively activate a particular light source of the plurality of light sources 134 such that the excitation emission 156 is directed toward at least one feature 136 corresponding to a location or feature identified by the signal received from the vehicle control module. In this configuration, the lighting controller 172 is operable to selectively illuminate a region of interest proximate the engine compartment 14 such that the region and a corresponding feature may be easily identified.

The lighting controller 172 may comprise a processor 192 comprising one or more circuits configured to receive signals from the vehicle control module and output signals to control each of light sources 134 to emit the excitation emission 156. The processor 192 may be in communication with a memory 194 configured to store instructions to control the activation of each of the light sources 134. The lighting controller 172 is further in communication with an ambient light sensor 196. The ambient light sensor 196 may be operable to communicate a light condition, for example a level of brightness or intensity of the ambient light proximate the vehicle 10. In response to the level of the ambient light, the lighting controller 172 may be configured to adjust an output intensity of the excitation emission 156 output from each of the light sources 134. The intensity of the light output from the light sources 134 may be adjusted by controlling a duty cycle, current, or voltage supplied to the light sources 134.

Figure 11:
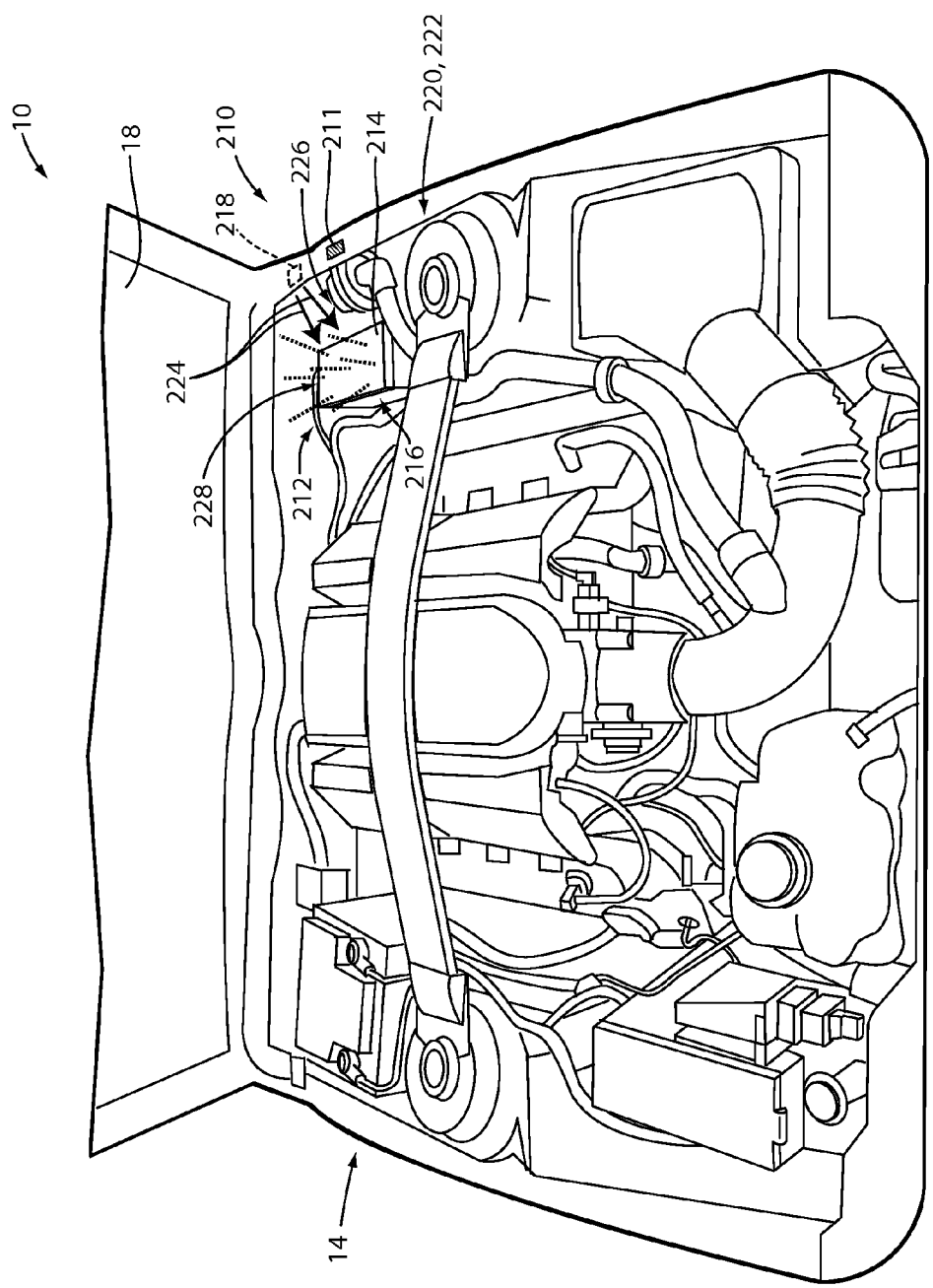
FIG. 11 is a perspective view of a vehicle having a lighting system configured to illuminate a power distribution box proximate an engine compartment.

Referring now to FIG. 11, a lighting system 210 may incorporate similar elements and features to the lighting systems 12 and 132. The lighting system 210 may be configured to illuminate at least one photoluminescent portion 212 configured to illuminate a power distribution box 214. The power distribution box 214 may further correspond to a electrical panel 216 according to one embodiment. As discussed herein, it may be challenging in some cases to identify various features and components disposed in the engine compartment 14. Each of the various lighting systems 12, 132, and 212 may be configured to illuminate at least a portion of the engine compartment 14 to improve the visibility of the features disposed therein and in some cases, identify a particular component or feature. One such feature that may be of interest to an operator of the vehicle 10 may be the power distribution box 214. Power distribution boxes or electrical panels are often hidden from view and challenging to locate when attempting to change in order to verify the status of a fuse for the vehicle 10.

The lighting system 210 may comprise at least one switch 211 or lighting controller in communication with a lighting device 218 disposed proximate a side portion 220 of the engine compartment 14. The switch 211 or lighting controller may be operable to selectively illuminate a light source of the lighting device 218. The lighting device 218 may be configured to illuminate the power distribution box 214 in response to one or more signals from the vehicle control module or the switch 211 indicating that the hood 18 is in an open position. The side portion 220 of the engine compartment 14 may correspond to a portion of a frame or support member 222 configured to support the hood 18 of the vehicle 10. Though the lighting device 218 is shown disposed proximate the side portion 220, the lighting device 218 may be secured to any portion of the vehicle 10 and oriented such that the first emission 224 may be transmitted to the at least one photoluminescent portion 212.

As shown in FIG. 11 the lighting device 218 is substantially hidden from a view directed inward toward the engine compartment 14. In this configuration, the lighting device 218 may emit a first emission 224 into the engine compartment 14 from the side portion 220 through a volumetric space 226 to the photoluminescent portion 212. In response to receiving the first emission 224, the at least one photoluminescent portion 212, disposed proximate the power distribution box 214, may become excited and emit an output emission 228 to illuminate at least a portion of the power distribution box 214. In this configuration, the power distribution box 214 may be easily identified such that an operator of the vehicle may locate and access the power distribution box 214.

The lighting controller configured to control the lighting device 218 may be similar to the lighting controller 172 and comprise one or more circuits or processors operable to receive signals from the vehicle controller. Based on the signals received, the lighting controller may selectively activate the light source of the lighting device 218. Additionally, the lighting device 218 may be configured to selectively activate in response to a signal received from the switch 211 in response to the hood 18 being oriented in the open position. The switch 211 may correspond to various forms of electrical switches configured to detect the hood 18 oriented in the open or closed position. For example, the switch 211 may correspond to an electrical relay, a biased switch, an inductive sensor, and various other forms of electrical or electromechanical switching devices. In some implementations, the switch 211 may also be configured to selectively activate the hood light 112 as shown in FIG. 4.

Figure 13:
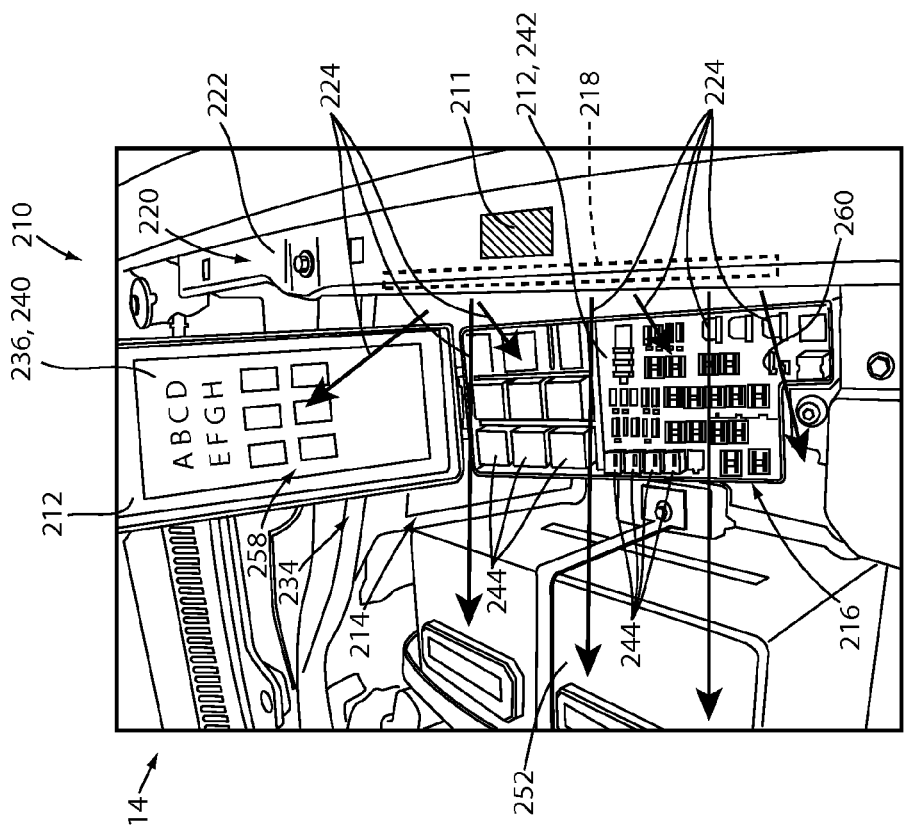
FIG. 13 is a detailed perspective view of a vehicle demonstrating a light source configured to illuminate a power distribution box in an open position in accordance with the disclosure.
Figure 12:
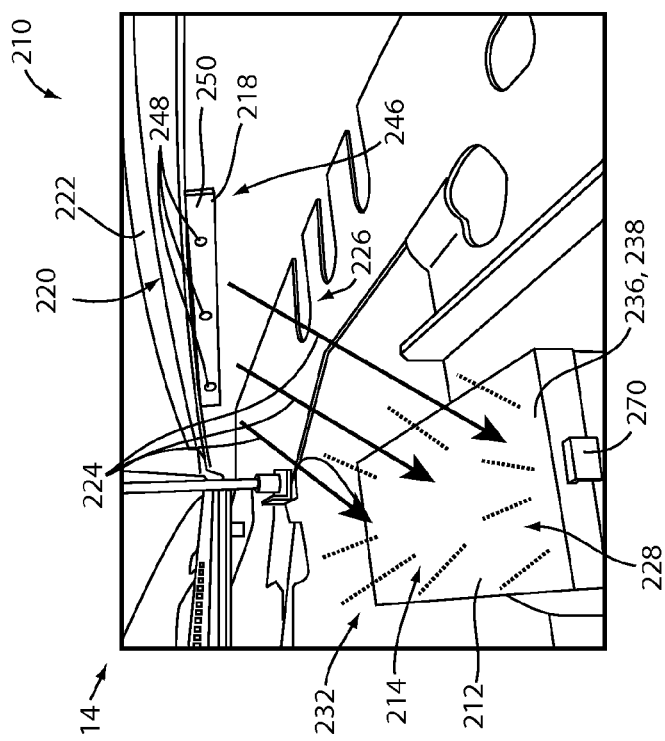
FIG. 12 is a detailed perspective view of a vehicle demonstrating a light source configured to illuminate a power distribution box in a closed position.

Referring now to FIGS. 12 and 13, the lighting system 210 is shown illuminating the power distribution box 214 in a closed position 232 and an open position 234, respectively. In the closed position 232, the lighting device 218 may be configured to emit the first emission 224 toward a cover portion 236 of the electrical panel 216 through the volumetric space 226. In response to receiving the first emission 224, the at least one photoluminescent portion 212 may become excited and emit the output emission 228 to illuminate at least a portion of the cover portion 236. In this way, the power distribution box 214 may become at least partially illuminated by the output emission 228 such that the power distribution box 214 may be easily identified within the engine compartment 14.

In some implementations, the at least one photoluminescent portion 212 may correspond to a plurality of photoluminescent portions 212. The plurality of photoluminescent portions may be disposed proximate an exterior surface 238 of the cover portion 236, an interior portion 240 of the cover portion 236, a fuse receiving portion 242 of the electrical panel 216, and/or one or more of a plurality of fuses 244 disposed in the electrical panel 216. The plurality of photoluminescent portions 212 may incorporate various energy conversion layers including various photoluminescent materials configured to emit a wide variety of colors in response to receiving the first emission 224. In this way, each of the photoluminescent portions 212 may be configured to illuminate in one or more colors in response to receiving the first emission 224.

Referring to FIG. 12, the lighting device 218 is disposed proximate an underside 246 of the support member 222. The lighting device 218 may comprise one or more light sources 248 or light emitters configured to emit the first emission 224 at the first wavelength $\lambda_1$. As discussed herein, the first wavelength $\lambda_1$ may correspond to a blue spectral color range. The blue spectral color range comprises a range of wavelengths generally expressed as blue light (~440-500 nm). In some implementations, the first wavelength $\lambda_1$ may also comprise wavelengths in a near ultraviolet color range (~390-450 nm). In response to the activation of the one or more light sources 248, the lighting device 218 may emit the first emission 224 toward the at least one photoluminescent portion 212. In this configuration, the origin of the first emission 224 may be hidden from a viewer looking into the engine compartment 14 such that one or more light sources 248 may remotely activate the at least one photoluminescent portion 212 without being visible to the viewer.

Each of the light sources 248 or light emitters may correspond to any form of light source, for example halogen lighting, fluorescent lighting, light emitting diodes (LEDs), organic LEDs (OLEDs), polymer LEDs (PLEDs), solid state lighting or any other form of lighting configured to output the first emission 224. The lighting device 218 may further comprise an optic portion 250 configured to direct the first emission 224 outward toward the power distribution box 214. In some implementations, the first emission 224 may also be directed toward a battery 252 or additional features located proximate the engine compartment 14. The optic portion 250 may be of polymeric material, for example acrylic material that is at least partially light transmissive. The optic portion 250 may further be configured to resist high temperatures corresponding to the engine compartment 14 and protect the at least one light source 248 from various environmental hazards that may occur in the engine compartment 14.

Referring now to FIG. 13, the lighting device 210 is shown illuminating the interior portion 240 of the cover portion 236 and the fuse receiving portion 242 of the electrical panel 216. The interior portion 240 may comprise photoluminescent material printed or molded into the plastic to outline a diagram 258 and/or text identifying one or more of the fuses 244. For example, the diagram 258 may be applied as a printed or stenciled coating to the interior portion 240. In some implementations, the diagram 258 may correspond to raised, or molded plastic applied to the interior portion 240 by a double shot molding process. In this configuration, the first emission 224 received from the lighting device 218 may cause the diagram 258 to illuminate such that the information described by the diagram 258 may be easily visible in any lighting condition. The diagram 258 may comprise a figure, lettering, and/or instructions, which may identify at least one component of the power distribution box 214.

The lighting device 218 may further be configured to direct the first emission 224 toward the fuse receiving portion 242. The fuse receiving portion 242 may outline one or more cavities configured to receive the fuses 244. In response receiving the first emission 224, the photoluminescent portion 212 corresponding to the fuse receiving portion 242 may illuminate an outer surface 260 of the fuse receiving portion 242. In this configuration, each of the cavities configured to receive the fuses 244 may be visible throughout a replacement operation of at least one fuse. Further, by illuminating the fuse receiving portion 242, each of the fuses 244 may be illuminated in a back-lit configuration such that an outline of each fuse is clearly identifiable.

In some implementations, one or more of the fuses 244 may also include photoluminescent portions similar to the plurality of photoluminescent portions 212 and configured to become excited and emit the output emissions in response receiving the first emission 224. For example, different types of fuses may comprise different types photoluminescent material disposed in a fuse casing and/or applied as a coating. In this way, each of the different types and styles of fuses may be configured to illuminate in an identifying color corresponding to each type of fuse. The various implementations and application of the photoluminescent materials applied to the power distribution box 214, the electrical panel 216, and/or the fuses 244 may provide for improved experience by those accessing and locating the power distribution box 214.

Referring again to FIGS. 12 and 13, the plurality of photoluminescent portions 212 may be described as a first photoluminescent portion 262, a second photoluminescent portion 264, a third photoluminescent portion 266, and a fourth photoluminescent portion 268. The first photoluminescent portion 262 may be disposed on the exterior surface 238 of the cover portion 236 of the electrical panel 216. The second photoluminescent portion 264 may be disposed on an outer surface 260 of the fuse receiving portion 242 of the electrical panel 216. The third portion 266 may disposed proximate a latch portion 270 of the cover portion 236. The fourth photoluminescent portion 268 may be disposed on the interior portion 240 of the cover portion 236. Each of the photoluminescent portions 212 may comprise different photoluminescent materials and combinations such that each of the photoluminescent portions 212 may be configured to illuminate in different colors.

Referring now to FIGS. 5, 8, and 11-13, in some implementations, the lighting system 210 may be implemented alone or in combination with one or both of the lighting systems 12 and 132. In such implementations, the light source 16 may be configured to emit the first emission 224 to illuminate one or more of the plurality of photoluminescent portions 212. The various light sources and photoluminescent portions as discussed herein may each be configured to emit wavelengths of light that may be configured to excite one or more of the various photoluminescent portions. The disclosure provides for various lighting systems that may be used independently and in combination to selectively illuminate one or more features located proximate the engine compartment 14. Each of the one or more features may comprise at least one photoluminescent portion proximate thereto such that the one or more emissions output from the light sources described herein may illuminate the features in a variety of functional and attractive lighting configurations.

In some implementations, each of the photoluminescent portions discussed herein (e.g. 212) may comprise an organic or inorganic fluorescent dye configured to convert the excitation emission 30 to the output emission For example, the photoluminescent portions 212 may comprise a photoluminescent structure of rylenes, xanthenes, porphyrins, phthalocyanines, or other materials suited to a particular Stoke shift defined by the first absorption range and emission fluorescence. In some embodiments, the photoluminescent portions 212 may be of at least one inorganic luminescent material selected from the group of phosphors. The inorganic luminescent material may more particularly be from the group of Ce-doped garnets, such as YAG:Ce. As such, each of the photoluminescent portions 212 may be selectively activated by a wide range of wavelengths received from the excitation emission 30 configured to excite a specific photoluminescent material and emit an output emission having a desired color.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. An illumination apparatus for a vehicle comprising:
   at least one photoluminescent portion disposed proximate a electrical panel disposed in an engine compartment; and
   a lighting device located proximate the engine compartment and separated from the at least one photoluminescent portion, the light source configured to emit a first emission to excite the at least one photoluminescent portion.

2. The apparatus according to claim 1, wherein the light source is disposed on an interior surface of a hood of the vehicle.

3. The apparatus according to claim 1, wherein the light source is disposed proximate a body portion of the vehicle corresponding to a frame configured to support a hood of the vehicle.

4. The apparatus according to claim 3, wherein the light source is configured to emit the first emission into the engine compartment from a side portion of the frame corresponding to an interior surface of the engine compartment.

5. The apparatus according to claim 4, wherein the light source is substantially hidden from a view outside the engine compartment such that an origin of the first emission is hidden.

6. The apparatus according to claim 1, wherein the at least one photoluminescent portion corresponds to a first photoluminescent portion disposed on an exterior surface of the cover portion of the electrical panel.

7. The apparatus according to claim 6, wherein the at least one photoluminescent portion corresponds to a second photoluminescent portion disposed proximate an outer surface of a fuse receiving portion of the electrical panel.

8. The apparatus according to claim 7, wherein the at least one photoluminescent portion further corresponds to a third photoluminescent portion disposed on a latch portion of the cover portion, the third photoluminescent portion configured to emit a different color of light than the first photoluminescent portion.

9. The apparatus according to claim 8, wherein the at least one photoluminescent portion further corresponds to a fourth photoluminescent portion disposed on an interior surface of the cover portion.

10. The apparatus according to claim 9, wherein the fourth photoluminescent portion corresponds to at least one of a figure, lettering, and instructions identifying at least one component of the in the power distribution box.

11. An illumination apparatus for a vehicle comprising:
    a cover portion configured to provide access to an electrical panel within an engine compartment;
    a light source configured to emit a first emission;
    at least one photoluminescent portion disposed on the electrical panel, wherein the light source is configured to:
    excite an exterior photoluminescent portion when the cover is arranged in an open position; and
    excite an interior photoluminescent portion when the cover is arranged in a closed position.

12. The apparatus according to claim 11, wherein the exterior photoluminescent portion is disposed on a cover portion of the electrical panel.

13. The apparatus according to claim 11, wherein the interior photoluminescent portion is disposed on a power distribution box substantially enclosed by the cover in the closed position.

14. The apparatus according to claim 12, wherein the exterior photoluminescent portion corresponds to a latch portion of the cover configured to at least partially illuminate in response to receiving the first emission.

15. The apparatus according to claim 13, wherein the interior photoluminescent portion is disposed proximate a surface of a power distribution box corresponding to an interior portion of the electrical panel.

16. An illumination apparatus for a vehicle comprising:
   at least one photoluminescent portion disposed proximate an electrical panel; and
   a lighting controller in communication with a lighting device located proximate an engine compartment and separated from the at least one photoluminescent portion, the light source configured to emit a first emission to excite the at least one photoluminescent portion, and excite the at least one photoluminescent portion when the electrical panel is arranged in an open position and a closed position.

17. The apparatus according to claim 16, further comprising a cover portion configured to provide access to the electrical panel.

18. The apparatus according to claim 17, wherein the light source is configured to excite an exterior portion of the at least one photoluminescent portion when the cover is arranged in an open position.

19. The apparatus according to claim 17, wherein the light source is configured to excite an interior portion of the at least one photoluminescent portion when the cover is arranged in a closed position.

20. The apparatus according to claim 16, wherein at least one fuse located in the electrical panel comprises a photoluminescent portion configured to become excited in response to receiving the first emission.

\* \* \* \* \*